Patented June 10, 1952

2,600,275

UNITED STATES PATENT OFFICE 2,600,275

SUBSTITUTED PENTANEDIOLS AND
DERIVATIVES THEREOF

Curtis W. Smith, Berkeley, Calif.

No Drawing. Application October 31, 1949,
Serial No. 124,736

8 Claims. (Cl. 260—615)

This invention relates to a new class of organic compounds. More particularly, the invention relates to novel substituted pentanediols and derivatives thereof, and to their utilization, particularly as plasticizers for organic resinous compositions.

Specifically, the invention provides substituted 1,5-pentanediols wherein the chain carbon atom immediately adjacent to one of the terminal carbinol groups is a tertiary carbon atom and the chain carbon atom adjacent to the other carbinol group is a quaternary carbon atom, one of the carbon atoms to which the said quaternary carbon atom is attached being the carbon atom of an ether-substituted alkyl group. The invention further provides useful and valuable derivatives of the above-described substituted pentanediols, particularly the ester derivatives obtained by reacting the said alcohols with organic carboxylic acids. The invention also provides organic resinous compositions plasticized with the above-described novel compounds.

It is an object of the invention to provide a new class of organic compounds. It is a further object to provide novel substituted 1,5-pentanediols and a method for their preparation. It is a further object to provide novel substituted 1,5-pentanediols possessing unique properties which make them particularly useful and valuable in industry. It is a further object to provide valuable derivatives of the above-described substituted pentanediols. It is still a further object to provide esters of the above-described substituted pentanediols which are particularly valuable as plasticizers. It is a further object to provide plasticized compositions having improved properties. Other objects and advantages of the invention will be apparent from the following detailed description thereof.

It has now been discovered that these and other objects may be accomplished by substituted 1,5-pentanediols wherein the chain carbon atom immediately adjacent to one of the terminal carbinol groups is a tertiary carbon atom and the chain carbon atom adjacent to the other carbinol group is a quaternary carbon atom, one of the carbon atoms to which the said quaternary carbon atom is attached being the carbon atom of an ether-substituted alkyl group, and derivatives of these substituted 1,5-pentanediols, particularly the ester derivatives obtained by reacting the said alcohols with organic carboxylic acids.

The novel alcohols of the invention may be broadly described as diols having a straight chain of five carbon atoms the terminal carbon atoms of which are joined to hydroxyl groups, a chain carbon atom adjacent to one of these terminal hydroxyl-bearing carbon atoms being a tertiary carbon atom, and the chain carbon atom adjacent to the other terminal hydroxyl-bearing carbon atom being a quaternary carbon atom which is joined to a carbon atom of an ether-substituted alkyl group. Examples of these diols are 2,4 - dimethyl - 2-methoxyethyl-1,5-pentanediol, 2,4 - di(methoxybutyl) - 2 - butoxymethyl-1,5 - pentanediol, 2,4-dimethyl-2-hydroxyethoxymethyl - 1,5 - pentanediol, 2,4-di(chlorobutyl) - 2 - methoxyethyl-1,5-pentanediol, 2,4-dihexyl-2-butoxymethyl-1,5 - pentanediol, 2,4 - dimethyl-2 - ethoxyhexyloxyethyl - 1,5 - pentanediol, 2-butyl - 4 - hexyl-2-propoxymethyl - 1,5-pentanediol, 2,4 - di(cyanobutyl) - 2 - isobutoxymethyl-1,5-pentanediol, 2,4-dicyclohexyl - 2 - allyloxymethyl-1,5-pentanediol, 2,4-diisopropyl-2-chloroethoxybutyl - 1,5 - pentanediol, 2,4 - diphenyl - 2-dodecyloxymethyl - 1,5 - pentanediol, 2,4-diethyl-2-diethoxybutoxymethyl - 1,5 - pentanediol, 2-cyanobutyl - 4 - octyl - 2 - hexyloxymethyl-1,5-pentanediol, 2,4 - di(chlorocyclohexyl) - 2-methallyloxybutyl - 1,5 - pentanediol, 2,4 - dibenzyl-2-phenoxymethyl - 1,5 - pentanediol, and 2,4-dibromobutyl - 2 - cinnamyloxymethyl-1,5-pentanediol.

The preferred diols are the substituted 1,5-pentanediols wherein the tertiary carbon atom joined to one of the terminal carbinol groups is joined to a carbon atom of an organic radical, such as hydrocarbon radicals, halo-, cyano-, ester-, etc., substituted hydrocarbon radicals, and preferably a hydrocarbon radical containing 1 to 18 carbon atoms, and the quaternary carbon atom joined to the other terminal carbinol group is joined to a carbon atom of the same type of organic radicals described above which are attached to the tertiary carbon atom, and to an ether-substituted methyl group wherein the substituent attached to the methyl group is a member of the group consisting of —OR radicals, —OCH$_2$R$_2$(OR)$_n$ radicals and

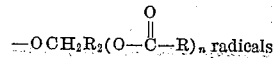
—OCH$_2$R$_2$(O—C—R)$_n$ radicals

R in each of the said radicals being a hydrocarbon radical, preferably containing from 1 to 15 carbon atoms, $n$ being an integer, preferably from 1 to 3, and each R$_2$ is a polyvalent hydrocarbon radical having a valency equal to $n+1$ and preferably containing from 1 to 15 carbon atoms. Examples of these preferred diols are 2,4-dioctyl-2-methoxybutoxymethyl - 1,5 - pentanediol, 2,4-didecyl-2-ethoxymethyl - 1,5 - pentanediol, 2,4-diamyl - 2 - benzyloxymethyl - 1,5 - pentanediol, 2,4-diamyl-2-butoxyhexoxymethyl -1,5- pentanediol, 2,4-dioctyl - 2 - cyclohexyloxymethyl - 1,5-pentanediol, 2,5-dicyclopentyl - 2 - ethoxymethyl-1,5-pentanediol, 2,4 - diheptyl - 2 - trimethylheptyloxymethyl - 1,5 - pentanediol, 2,4 - diethyl-2-valeroxybutoxymethyl - 5 - pentanediol, 2,4-dioctyl - 2 - (3',7'-diacetoxyheptoxymethyl) -1,5-pentanediol, 2,4-dibenzyl - 2 - dodecyloxymethyl-1,5 - pentanediol, 2,4 - didecyl - 2 - ethoxymethyl-1,5-pentanediol, 2,4-diamyl - 2 - acetoxybutoxymethyl - 1,5 - pentanediol, and 2,4 - diamyl - 2 - hexyloxymethyl-1,5-pentanediol.

Particularly preferred diols are those of the general formula:

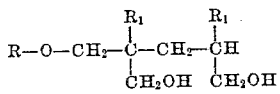

wherein R is a hydrocarbon radical which is free of any type of aliphatic unsaturation, i. e., free of ethylenic and/or acetylenic linkages, and preferably contains from 1 to 15 carbon atoms, and both $R_1$'s are identical alkyl radicals, preferably containing from 1 to 8 carbon atoms. Examples of these diols are 2,4-dimethyl-2-methoxymethyl-1,5-pentanediol, 2,4-dibutyl - 2 - propoxymethyl-1,5-pentanediol, 2,4 - dimethyl - 2 - isobutoxymethyl-1,5-pentanediol, 2,4-diamyl - 2 - benzyloxymethyl - 1,5 - pentanediol, 2,4 - diethyl-2-hexyloxymethyl-1,5-pentanediol, 2,4 - dibutyl - 2 - butoxymethyl-1,5-pentanediol, 2,4 - dimethyl-2-nonyloxymethyl-1,5-pentanediol, 2,4 - dihexyl-2-decyloxymethyl-1,5-pentanediol, 2,4 - dioctyl-2-benzyloxymethyl - 1,5 - pentanediol, and 2,4-diheptyl - 2 - cyclohexylmethoxymethyl - 1,5-pentanediol.

The diols of the above-described formula wherein R is an ether-substituted hydrocarbon radical —$CH_2R_2(OR)_n$ wherein R is a hydrocarbon radical containing from 1 to 10 carbon atoms, $R_2$ is a polyvalent hydrocarbon radical containing from 1 to 10 carbon atoms and having a valency equal to $n+1$ and $n$ is an integer from 1 to 3, come under special consideration, particularly because of the improved properties of the said diols and their esters as plasticizers for the various organic resinous materials described hereinbelow. Examples of these diols are 2,4 - dimethyl - 2 - ethoxypropoxymethyl-1,5 - pentanediol, 2,4 - dioctyl -2- butoxypropoxymethyl -1,5 - pentanediol, 2,4-diethyl - 2 - hexanoxybutoxymethyl-1,5-pentanediol, 2,4-dihexyl-2 - butoxypropoxymethyl - 1,5 - pentanediol, 2,4-dioctyl -2- phenoxybutoxymethyl -1,5- pentanediol, 2,4 - diheptyl - 2 - hexyloxybutoxymethyl-1,5 - pentanediol, 2,4 - dimethyl - 2 - phenoxypropoxymethyl - 1,5 - pentanediol, 2,4 - diamyl-2 -(3',5'- dibutoxybutoxymethyl) -1,5- pentanediol, 2,4 - dihexyl - 2 - (3',5',7' - triethoxyoctyloxymethyl) -1,5-pentanediol, and 2,4-diamyl-2-cyclohexyloxybutoxymethyl-1,5-pentanediol.

The above-described substituted 1,5-pentanediols may be prepared by any suitable method. They may be prepared, for example, by reacting a 2,4 - dihydrocarbyl - 2 - alkoxymethyl - 1,5-dihalopentane with water, silver hydroxide or a strong base, or by hydrolyzing a substituted dihydropyran and hydrogenating the resulting product. The diols are preferably prepared, however, by hydrogenating the corresponding substituted 1,5-pentanedials, or the lactones prepared from these 1,5-pentanedials.

Substituted 1,5-pentanedials used in this reaction may be illustrated by 2,4-dimethyl-2-allyloxymethyl - 1,5 - pentanedial, 2,4 - dioctyl-2 - methoxymethyl - 1,5 - pentanedial, 2,4 - dibutyl - 2 - propoxymethyl - 1,5 - pentanedial, 2,4-diamyl-2-benzyloxymethyl-1,5-pentanedial, 2,4-diethyl - 2 - methoxymethyl - 1,5 - pentanedial, 2,4 - dioctyl - 2 - methoxybutoxymethyl - 1,5-pentanedial, 2-butyl-4-decyl-2-ethoxymethyl-1,5-pentanedial, 2,4 - dimethyl - 2 - hydroxymethoxyethyl - 1,5 - pentanedial, 2,4 - diethyl - 2 - dichlorocyclohexyloxymethyl - 1,5 - pentanedial, and 2,4-dibromobutyl-2-cinnamyloxymethyl-1,5-pentanedial.

The lactones used in the hydrogenation reaction may be exemplified by alpha,gamma-diethyl - gamma - butoxymethyl - delta - valerolactone, alpha,gamma-dimethyl-gamma-cyclohexyloxymethyl - delta - valerolactone, alpha,-gamma - dioctyl - gamma - phenyloxymethyl-delta - valerolactone, and alpha,gamma - didecyl-gamma-octyloxymethyl-delta-valerolactone.

The hydrogenation of the dialdehydes or their lactones is preferably accomplished by contacting the said compounds with hydrogen in the presence of a hydrogenation catalyst. Catalysts that may be used in this process may be exemplified by the oxides or sulfides of metals, preferably nickel, tungsten, molybdenum, cerium, thorium, chromium and zirconium, or mixtures comprising two or more metal oxides and/or sulfides, or one or more metal oxides or sulfides with one or more metals. Compound catalysts comprising two or more metals in admixture or alloyed as for example, silver-copper, copper-chromium, copper-zinc, nickel-cobalt, nickel-zinc, and the like, may also be used. Catalysts may also be selected from the noble metals, such as silver, gold, platinum, palladium, and the like. Preferred catalysts are metals selected from the group consisting of nickel, iron, cobalt, copper, chromium, thallium, and the like. Excellent results may be obtained by employing a finely divided pyrophoric metal catalyst, such as Raney nickel, and such catalysts are the more preferred.

The amount of the catalyst employed may vary over a considerable range depending upon the type of catalyst employed, the substituted pentanedial to be reduced, etc. In general, the amount of the catalyst will vary from 1% to 50% by weight of the organic reactants. Preferred amounts of catalyst range from 1% to 30% by weight. When Raney nickel is employed, it is generally employed in amounts varying from 1% to 20% by weight.

If desired, inert solvents may be included in the reaction mixture to facilitate stirring and help maintain the efficiency of the catalyst. Examples of suitable solvents are methyl alcohol, ethyl alcohol, dioxane, aliphatic hydrocarbons, aromatic hydrocarbons, or mixtures thereof, and in the case of water soluble material, water. The ratio of the solvent to the reactants may vary over a considerable range. A suitable ratio is 3 parts of solvent to 1 part of reactants, although larger ratios, e. g., as high as 100 to 1, and smaller ratios, e. g., as low as 0.1 to 1, may be used in some cases.

The hydrogenation is preferably accomplished at elevated temperatures. In most cases the temperature may be maintained about 50° C. below the decomposition temperature of the reactants. Preferred temperatures range from about 65° C. to 300° C., with a more preferred range varying from 80° C. to 150° C.

In most cases, pressure above atmospheric, and generally between 30 and 3000 pounds per square inch may be utilized. Pressures between about 200 and 1000 pounds per square inch are usually preferred.

The substituted 1,5-pentanediols formed in the reaction may be recovered therefrom by any suitable means, such as extraction, distillation, fractional precipitation, and the like.

Many of the substituted 1,5-pentanedials employed in the above-described hydrogenation process may be prepared by reacting a suitable alpha-methylene aldehyde with a hydroxy-containing compound in the presence of a basic condensation catalyst. This reaction may be illustrated by the following equation:

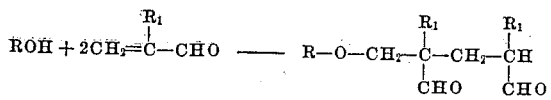

Unsaturated aldehydes used in this type of reaction may be exemplified by methacrolein, alpha-ethylacrolein, alpha-propylacrolein, alpha-isopropylacrolein, alpha-cyclohexylacrolein, alpha-phenylacrolein, alpha-octylacrolein, alpha-decylacrolein, and homologous and analogous substituted acroleins wherein the alpha carbon atom is tertiary and the beta carbon atom is primary.

The hydroxy-containing compounds include among others, ethyl alcohol, methyl alcohol, propyl alcohol, butyl alcohol, octyl alcohol, decyl alcohol, tetradecyl alcohol, octadecyl alcohol, ethylene glycol monoethyl ether, glycerol diacetate, glycerol diethyl ether, glycerol, diphenyl ether, glycerol dioctyl ether, and the like.

The basic condensation catalysts employed in the reaction may be exemplified by the alkali metal hydroxides and carbonates, such as sodium hydroxide, potassium hydroxide, lithium hydroxide, rubidium hydroxide, and cesium hydroxide, the hydroxides of the alkaline earth metals, such as calcium hydroxide and barium hydroxide, and organic bases, such as pyridine, benzyltrimethyl-ammonium hydroxide, piperidine, tetramethyl-ammonium hydroxide, etc. The amount of the catalyst employed is critical. This is because excessive amounts of the basic-acting substance causes polymerization of the unsaturated aldehyde. On the other hand, unless a sufficient amount of the catalyst is employed, the desired reaction does not take place. Amounts of the basic condensation catalysts sufficient to provide a concentration in the reaction mixture of from about 0.001 to 0.4 gram-equivalents per liter are generally effective, a preferred range, because of the minimal formation of by-products, being from 0.01 to 0.08 equivalents per liter.

Substantially anhydrous conditions are preferably employed in the reaction. In the presence of excessive amounts of water, polymerization of the unsaturated aldehyde becomes excessive, and no detectable amounts of the 1,5-pentanedials are produced. Inert organic solvents, such as hydrocarbons, ethers, heterocyclic oxygen-containing compounds, and the like, may be used as desired.

The quantity of reactants employed may vary over a considerable range. In general, molar ratios of hydroxy-containing compound to the unsaturated aldehyde may vary from 1:2 to about 10:1. Preferably, the molar ratios of hydroxy-containing compound to unsaturated aldehyde vary from 1:1 to 5:1. The reaction mixture may be prepared by adding the catalyst to the hydroxy-containing compound and thereafter adding the unsaturated aldehyde, by first mixing the hydroxy-containing compound and aldehyde and then adding the catalyst to the mixture or by substantially simultaneously mixing all three.

Temperatures employed in the process are preferably those ranging from 0° C. to about 50° C. Higher temperatures tend to cause excessive polymerization of the unsaturated aldehyde. An optimum range when methacrolein is employed as the unsaturated aldehyde is from about 15° C. to about 40° C.

After completion of the reaction, the catalyst may be neutralized by the careful addition of an acid, such as formic acid, or addition of buffer mixtures, and the desired products recovered from the mixture by any suitable means, such as fractional distillation, extraction, precipitation, and the like.

The lactones used in the hydrogenation process may be prepared from the above-described substituted 1,5-pentanedials by treating the said dialdehydes with an aluminum lower alcoholate in an inert solvent. A more detailed description of this method may be found in copending application Serial No. 50,253, filed September 20, 1948, now Patent Number 2,526,702.

The substituted 1,5-pentanediols of the invention possess many unexpected beneficial properties which make them particularly useful and valuable in industry. They are especially valuable in the preparation of inks, dyes and paints, as blending agents, tackifiers, textile lubricants, lubricating oil additives, and as softening agents for natural and synthetic organic polymeric materials, such as the casein and other protein plastics, lignin plastics, synthetic linear polyamides, phenol-aldehyde type resins, urea-aldehyde type resins, and the like. The diols possessing an unsaturated group in the ether side chain are also of value in that they may be polymerized with themselves or with other polymerizable unsaturated organic compounds to produce polymeric material of value in the preparation of surface coating compositions, impregnating agents, rigid plastic articles, and the like.

The novel substituted 1,5-pentanediols are also of value as intermediates in the production of many useful and valuable derivatives. The diols may be reacted, for example, with organic carboxylic acids to produce important ester derivatives. The acids used for this purpose may be monocarboxylic or polycarboxylic, saturated or unsaturated, and may be aliphatic, alicyclic, heterocyclic or aromatic. They may also be substituted if desired with non-interfering substituents, such as halogen atoms, alkoxy radicals, and the like. If the acids are polycarboxylic acids they may contain two, three, four or more carboxyl groups, all but one of which may remain unesterified or may be esterified with other types of alcohols, such as methyl alcohol, ethyl alcohol, butyl alcohol, allyl alcohol, methallyl alcohol, and the like. Illustrative examples of these acids are acetic acid, butyric acid, hexanoic acid, enanthic acid, caprylic acid, pelargonic acid, capric acid, hendecanoic acid, lauric acid, myristic acid, palmitic acid, stearic acid, arachidic acid, angelic acid, sorbic acid, hydrosorbic acid, 2-octenedioic acid, acrylic acid, methacrylic acid, crotonic acid, alpha-chloroacrylic acid, 2,8-decadienoic acid, 2,5-heptadienoic acid, cyclohexanoic acid, cyclopentenoic acid, butylcyclohexanoic acid, tartaric acid, benzoic acid, naphthoic acid, toluic acid, methylbenzoic acid, nonylbenzoic acid, nicotinic acid, succinic acid, glutaric acid, diglycolic acid, pimelic acid, ketopimelic acid, suberic acid, azelaic acid, brassylic acid, maleic acid, fumaric acid, 1,2,4-pentanetricarboxylic acid, 1,2,4-butanetricarboxylic acid, 3-hexene-1,2,3,4-tetracarboxylic acid, heptane-1,2,3,4-tetracarboxylic acid, phthalic acid, isophthalic acid, terephthalic acid, tetrachlorophthalic acid, trimesic acid, pyromellitic acid, 1,4-cyclohexanedicarboxylic acid, cyclohexaneacetic acid, chlorocyclohexanoic acid, dibromotoluic acid, methoxysuccinic acid, and citric acid.

To illustrate the manner in which the invention may be carried out the following examples are given. It is to be understood that the examples are for the purpose of illustration and the invention is not to be regarded as limited to any of the specific compounds or conditions recited therein. Unless otherwise specified, parts disclosed in the following examples are parts by weight.

Example I

About 140 parts of methacrolein was added to about 320 parts of a methanol solution containing 0.014 mole per liter of NaOH. After the mixture was allowed to stand for three hours it was neutralized by the addition of formic acid and fractionally distilled under reduced pressure. After separation of unreacted methacrolein, methanol, and lower-boiling reaction products, 2,4-dimethyl-2-methoxymethyl-1,5-pentanedial was separated as a fraction distilling between 60° C. and 65° C. (0.1 mm.).

About 172 parts of the 2,4-dimethyl-2-methoxymethyl-1,5-pentanedial was then hydrogenated over Raney nickel at 100° C. and 1000 pounds per square inch gauge. Distillation of the product yielded 155 parts of a clear viscous liquid identified as 2,4-dimethyl-2-methoxymethyl-1,5-pentanediol. The diol had the following properties: B. P. 90-93° C. (0.5 mm.); $n_D^{20}$ 1.4609; sp. gr. 1.0045; analysis—C percent w. found 61.14, calc. 61.33, H percent w. found 11.39, calc. 11.44; hydroxyl value 1.127 eq./100 g. calc. 1.137 eq./100 g.

Example II 2,4-dimethyl-2-ethoxymethyl-1,5-pentanedial was prepared by reacting methacrolein and ethyl alcohol in the presence of NaOH at a temperature of about 23° C. The resulting 2,4-dimethyl-2-ethoxymethyl-1,5-pentanedial distilled at 71° C. to 73° C. (pressure of 0.5 mm. mercury).

About 150 parts of the 2,4-dimethyl-2-ethoxymethyl-1,5-pentanedial is hydrogenated over Raney nickel at 120° C. and 500 p. s. i. g. Distillation of the resulting mixtures yields a clear viscous liquid identified as 2,4-dimethyl-2-ethoxymethyl-1,5-pentanediol.

Example III

About 37.1 parts of methacrolein was added to a solution prepared by mixing 2.3 parts of 2 N aqueous sodium hydroxide with 186 parts of 3,3-dimethyl-1-pentanol. The resulting mixture was cooled to a temperature between 25° C. and 30° C. After two hours at this temperature, the reaction mixture was neutralized and distilled. After separation of the unreacted alcohol and methacrolein, 2,4-dimethyl-2-(3',3'-dimethylpentoxymethyl)-1,5-pentanedial was separated as a fraction distilling between 125° C. and 135° C. (1 to 4 mm. pressure).

About 100 parts of the 2,4-dimethyl-2-(3',3'-dimethylpentoxymethyl)-1,5-pentanedial is hydrogenated over Raney nickel at 100° C. and 1000 p. s. i. g. Distillation of the resulting mixture yields a clear viscous liquid identified at 2,4-dimethyl-2-(3',3'-dimethylpentoxymethyl)-1,5-pentanediol.

Example IV

About 280 parts of methacrolein is added to about 125 parts of a solution prepared by mixing 5 parts of 2.2 N aqueous sodium hydroxide with 150 parts of ethylene glycol monoethyl ether. After allowing the mixture to stand for several hours the solution is neutralized and distilled under reduced pressure to yield 2,4-dimethyl-2-ethoxyethoxymethyl-1,5-pentanedial.

About 150 parts of the 2,4-dimethyl-2-ethoxyethoxymethyl-1,5-pentanedial produced above is hydrogenated over Raney nickel at 100° C. and 1000 p. s. i. g. Distillation of the resulting mixture yields a viscous liquid identified as 2,4-dimethyl-2-ethoxyethoxymethyl-1,5-pentanediol.

Example V

About 50 parts of alpha-isopropylacrolein is added to about 150 parts of a solution prepared by mixing 5 parts of 2.2 N aqueous sodium hydroxide with 150 parts of cyclohexanol. After the mixture is allowed to stand for several hours it is neutralized and distilled under reduced pressure to yield 2,4-diisopropyl-2-cyclohexyloxymethyl-1,5-pentanedial.

About 100 parts of the 2,4-diisopropyl-2-cyclohexyloxymethyl-1,5-pentanedial is then hydrogenated as shown in the preceding example. Distillation of the resulting mixture yields 2,4-diisopropyl-2-cyclohexyloxymethyl-1,5-pentanediol.

I claim as my invention:

1. A substituted 1,5-pentanediol wherein the chain carbon atom immediately adjacent to one of the terminal carbinol groups is a tertiary carbon atom and the chain carbon atom adjacent to the other carbinol group is a quaternary carbon atom, one of the carbon atoms to which the said quaternary carbon atom is attached being the carbon atom of an ether-substituted alkyl group.

2. A substituted 1,5-pentanediol wherein a chain carbon atom immediately adjacent to one of the terminal hydroxyl-bearing carbon atoms is joined to a hydrocarbon side chain containing from 1 to 18 carbon atoms, and the chain carbon atom adjacent to the other terminal hydroxyl-bearing carbon atom is joined to a hydrocarbon side chain containing from 1 to 18 carbon atoms and to a —$CH_2OCH_2R_2(OR)_n$ group wherein each R is a hydrocarbon radical containing from 1 to 15 carbon atoms, $n$ is an integer and $R_2$ is a polyvalent hydrocarbon radical having a valency equal to $n+1$ and containing from 1 to 15 carbon atoms.

3. A substituted 1,5-pentanediol wherein a chain carbon atom immediately adjacent to one of the terminal hydroxyl-bearing carbon atoms is joined to a hydrocarbon side chain containing from 1 to 18 carbon atoms, and the chain carbon atom adjacent to the other terminal hydroxyl-bearing carbon atom is joined to a hydrocarbon side chain containing from 1 to 18 carbon atoms and to a $CH_2OR$ radical wherein R is a hydrocarbon radical containing from 1 to 15 carbon atoms.

4. 2,4-dialkyl-2-alkoxymethyl-1,5-pentanediol.

5. 2,4-dimethyl-2-ethoxyethoxymethyl-1,5-pentanediol.

6. 2,4-dimethyl-2-ethoxymethyl-1,5-pentanediol.

7. 2,4-dimethyl - 2-methoxymethyl-1,5-pentanediol.

8. 2,4-dimethyl - 2 - (3',3' - dimethylpentoxymethyl)-1,5-pentanediol.

CURTIS W. SMITH.

REFERENCES CITED

The following references are of record in the file of this patent:

UNITED STATES PATENTS

| Number | Name | Date |
|---|---|---|
| 2,469,446 | Strauss | May 10, 1949 |
| 2,492,955 | Ballard | Jan. 3, 1950 |

FOREIGN PATENTS

| Number | Country | Date |
|---|---|---|
| 820,018 | France | Oct. 30, 1937 |

OTHER REFERENCES

Purdie et al.: Jour. Chem. Soc. (London), volume 97, pages 1524–36 (1910). (Copy in Scientific Library.)

Helferich: Berichte der Deutches Chemisches Gesellschafte (German) volume 56B, pages 759–66 (1923). (Copy in Scientific Library.)